United States Patent [19]

Williams, Jr.

[11] Patent Number: 4,560,184
[45] Date of Patent: Dec. 24, 1985

[54] TRAILER HITCH

[76] Inventor: Thomas M. Williams, Jr., Rte. 8, Box 414, Durham, N.C. 27704

[21] Appl. No.: 674,524

[22] Filed: Nov. 23, 1984

[51] Int. Cl.⁴ .............................................. B62D 1/16
[52] U.S. Cl. .................................. 280/478 B; 280/508; 280/477
[58] Field of Search ............... 280/508, 510, 504, 511, 280/477, 478 R, 478 B

[56] References Cited

U.S. PATENT DOCUMENTS

| | | | |
|---|---|---|---|
| 2,062,788 | 12/1936 | Jacob | 280/477 |
| 2,671,673 | 3/1954 | Benson | 280/477 |
| 3,161,422 | 12/1964 | Wade | 280/508 |
| 3,329,445 | 7/1967 | Carson | 280/478 B |
| 3,891,237 | 6/1975 | Allen | 280/477 |

Primary Examiner—John A. Pekar
Assistant Examiner—Donn McGiehan
Attorney, Agent, or Firm—B. B. Olive

[57] ABSTRACT

An automatic trailer hitch assembly mounts a shank unit on the trailer and a receiving unit on the towing vehicle. The shank unit provides an elongated shank member which mounts a trailer ball at one end coupled to a conventional trailer hitch ball socket housing secured to the trailer and at the opposite end is formed to slide on funnel-like guide passages into the receiving unit. The receiving unit has a locking pin which can be latched into a position allowing entry of the shank member into the receiving unit and when the shank unit is properly positioned therein is automatically unlatched and moved into a position for locking the shank unit and receiving unit together. The locking pin when restored to the latched position enables the shank unit to be withdrawn from the receiving unit.

9 Claims, 13 Drawing Figures 4,560,184

TRAILER HITCH

DESCRIPTION

1. Technical Field

The present invention relates to trailer hitches and particularly to a trailer hitch which automatically couples a recreational trailer to its towing vehicle.

2. Background Art

The most common hitch employed for securing a recreational trailer to a towing vehicle utilizes a trailer ball mounted on the rear of a towing vehicle releasably coupled to a trailer ball socket housing typically mounted on the trailer tongue. When the trailer is small and of light weight, the job of coupling the trailer to the towing vehicle is easily accomplished simply by moving the trailer to the vehicle. However, when a recreational trailer is itself extremely heavy and particularly when it is carrying a heavy load such as a heavy boat or camper, it is normally not practical to attempt to pull the trailer to the towing vehicle for the purpose of coupling the trailer to the vehicle. Therefore, with heavy trailer equipment, the common practice is to support the tongue with an adjustable jack and maneuver the vehicle until the ball and trailer coupler are aligned and suitably positioned for engagement.

A common practice for aligning a towing vehicle with a detached trailer is for one person to monitor the progress of the vehicle towards the trailer while another person operates the towing vehicle. Another practice has been to attach some type of elevated visible marker to the trailer at the location of the trailer ball to assist the driver of the towing vehicle in aligning the vehicle with the trailer and once aligned the driver alone completes the coupling. Appropriately positioned auxiliary mirrors have also been employed. While it is possible for the vehicle driver to carry out this process alone, engagement under these circumstances is difficult since the vehicle driver is normally required to alternate between operating the towing vehicle and monitoring its progress towards the trailer. It would therefore be desirable to provide a trailer hitch which would enable the driver of the towing vehicle to bring the coupling elements of the vehicle and trailer into coupling alignment and also to automatically couple the towing vehicle with the trailer, once so aligned.

Various attempts have been made in the past to provide an automatic trailer hitch. U.S. Pat. No. 2,062,788 discloses a trailer hitch which requires initial alignment of the coupled parts but which will automatically couple after this initial alignment has been accomplished. There is illustrated a tapered shank with a probe for guiding the shank into the bore of a receiving unit. The shank is mounted on the trailer ball which in turn is mounted on the towing vehicle. The receiving unit is mounted on the trailer. Once the shank has been fully inserted into the receiving unit, it is secured by means of lock dogs.

U.S. Pat. No. 2,671,673 discloses a trailer hitch for use with a farm tractor. The tongue of the towed farm implement mounts a flat shank piece with a hole and the draw bar of the tractor mounts both a receiving unit with a wide mouth ramp for guiding the shank and a spring-loaded locking pin which passes through the hole in the shank to complete the coupling. Since the driver of a farm tractor normally has substantially unobstructed vision of the tractor drawbar, it would appear that the tractor hitch illustrated in U.S. Pat. No. 2,671,673 depends on the mentioned shank and ramp being brought into essentially perfect alignment prior to the described automatic coupling operation. When it is desired to uncouple the hitch described in U.S. Pat. No. 2,671,673, it is also necessary that the coupling pin be manually held in a raised position while the tractor moves forward to disengage the trailer from the tractor.

In U.S. Pat. No. 3,891,237 an elongated shank extends rearwardly from the towing vehicle and has one end formed with a socket secured to a ball mounted on the rear of the towing vehicle. The opposite end of the shank has a notch for entering a bell-shaped flange forming part of a receiving unit secured to the tongue of the trailer. The bell-shaped flange guides the shank into the receiving unit and the notch of the shank is automatically received and interlocked with a spring-loaded pawl to complete the coupling. A bolt is illustrated which is manually passed through mating holes formed in the receiving unit and the shank to complete the coupling. The shank is held in a substantially horizontal position by means of a spring supported on the rear of the towing vehicle. Uncoupling of this type of hitch requires that the pawl be manually held in a raised position while the towing vehicle and the trailer are uncoupled.

An arrangement known in the prior art for facilitating change of hitch size is a square hollow tube fixed to the towing vehicle in which is received a manually-installed removable pin secured shank on which the towing ball is mounted. However, this arrangement does not lend itself to automatic coupling.

The described examples are believed sufficient to illustrate the state of the art and the need for an improved automatic trailer hitch useful with a standard modern-type of conventional trailer ball coupler. The present invention seeks to provide an improved trailer hitch which secures to but requires no modification of the conventional and widely-used recreational metal-formed trailer ball socket housing, which requires only a one-time modification to the towing vehicle, which enables the coupling operation to be completed without requiring precise alignment and which does not require manual holding and unlatching of the coupling pin during the uncoupling operation.

DISCLOSURE OF INVENTION

In accordance with the present invention, there is provided a receiving unit mounted on the rear of a towing vehicle and a tapered shank that can be readily attached to the standard trailer coupler and which can be guided into the receiving unit for coupling the towing vehicle to the trailer without requiring precise alignment prior to the coupling operation. The receiving unit has a funnel-shaped guide for orienting the leading end of the shank into the bore of the receiving unit when the vehicle is being backed towards the trailer and a spring-loaded locking pin which automatically moves into position to secure the shank within the bore when the coupling has been completed. The locking pin is provided with means by which the locking pin can be locked in an open position prior to the shank's insertion into the receiving unit and such that the locking pin will automatically move to a latching position once the shank has been guided into place. The shank itself mounts a standard trailer ball at one end so that it can be readily clamped to a standard trailer ball socket coupler and utilizes a unique spring-loaded leveling device adapted to engage the lip of a standard trailer ball socket coupler for holding the shank in a substantially horizontal or other selected position appropriate to automatic coupling.

BEST MODE FOR CARRYING OUT THE INVENTION

Figure 6:
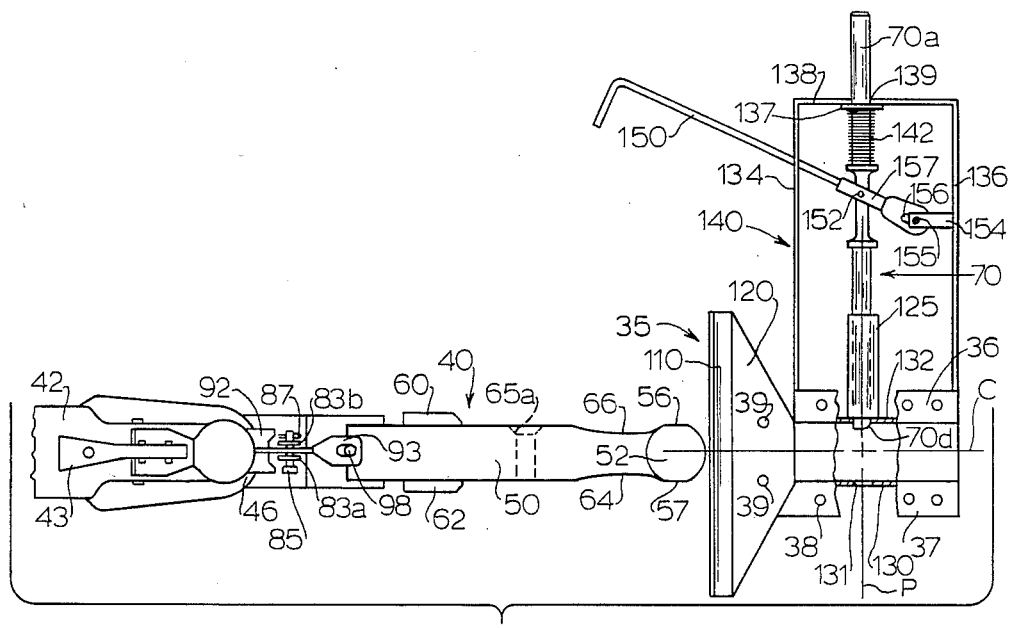
FIG. 6 is a top plan view of the receiving unit about to receive the shank portion of the invention hitch arrangement with the latch pin and lever being shown cocked and ready for activation.

Making reference initially to FIGS. 1, 2 and 5-6, the automatic trailer hitch of the invention, generally designated 30, comprises a receiving unit 35 fixedly attached to a towing vehicle, such as a truck, automobile, or the like, and a shank unit 40 coupled to a conventional ball socket housing 42 mounted on a towed vehicle, such as a recreational boat trailer. Neither the towing vehicle nor the towed vehicle is illustrated for simplification of the drawings. However, it may be noted that the receiving unit 35 includes a pair of metal plates 36, 37 with holes 38 for mounting suitable brackets, not shown, for attaching the receiving unit beneath and to the frame of the towing vehicle. Additional holes 39 enable a bumper bracket, not shown, or the like, to be used for additional securement of the receiving unit 35 to the towing vehicle. Holes 34 receive safety chains. It may be assumed for purposes of the description that the receiving unit 35 is suitably attached to the towing vehicle and that the particular towed vehicle employed mounts a shank unit 40 as illustrated. In use, the uncoupled receiving unit 35 and shank unit 40 shown in FIG. 6, are adapted to be automatically coupled as later explained when the towing vehicle is driven rearwardly to bring the shank unit 40 into coupling relation with the receiving unit 35 as in FIG. 8.

Figure 13:
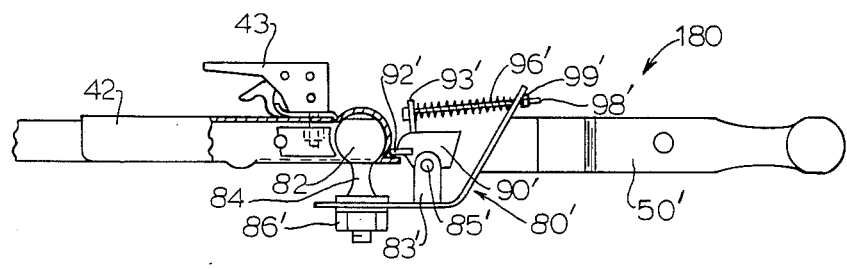
FIG. 13 is a side elevation view of an alternative shank embodiment adapted for use on a high bumper vehicle.

A first embodiment of the shank unit is illustrated in FIGS. 1, 2 and 6-8 and a second embodiment in FIG. 13. The receiving unit 35 is illustrated in only one embodiment in FIGS. 3-8. The description will first make reference and will describe the construction and operation of the first embodiment of the shank and the receiving unit before proceeding to a description of the second embodiment of the shank unit.

Shank unit 40 comprises an elongated shank 50 mounting at its forward end a ball-shaped probe 52 with flat vertically disposed side surfaces 56, 57 and flat horizontally disposed top and bottom surfaces 58, 59, it having been discovered that with the leading end 52a of ball 52 being rounded, the respective flat side, top and bottom surfaces, substantially facilitate entry of ball 52 into the receiving unit 35. Shank 50 also mounts a pair of opposed stop blocks 60, 62 which serve both to limit the extent of entry of shank 40 into receiving unit 35 and also to accept forces imposed on the hitch during braking of the towing vehicle. The position of stop blocks 60, 62 are also selected to ensure that shank 40, when fully entered into the receiving unit 35, is located in a proper pin-receiving position for coupling. Shank 50 has inwardly-tapered, vertically-disposed side surfaces 64, 66 and inwardly-tapered top and bottom surfaces 67, 68 forward of blocks 60, 62 and which smoothly merge into the respective flattened ball surfaces 56, 57 and 58, 59 to further facilitate entry of the shank unit 40 into and withdrawal from the receiving unit 35. A pin-receiving hole 65 passes through the width of shank 50 for receiving a locking pin 70 (FIG. 3) when shank 50 is fully inserted as later described. Shank 50 may be formed of substantially strong metal tubing or made as a solid metal piece if desired with stop blocks 60, 62 formed separately and welded or otherwise secured in place or formed integrally with the rest of shank 50.

A bent metal strip ball support 80 secured to the trailing end of shank 50 extends rearwardly and mounts a conventional trailer hitch ball 82 by means of ball mount 84 and nut 86. Ball 82 is selected to be of the same size as the socket size of the conventional ball socket housing 42 into which the ball 82 is received.

Ball 82 of the described shank unit 40 mates with and is loosely received by the socket of the conventional type of metal ball socket housing 42 and is retained therein by means of a conventional ball latch 43. Ball socket housing 42 mounts on the end of the trailer tongue 45 as illustrated in FIGS. 1 and 2 and is characterized by having a forwardly extending ledge 46 which the invention mechanism next described utilizes as a clamping ledge.

Figure 1:
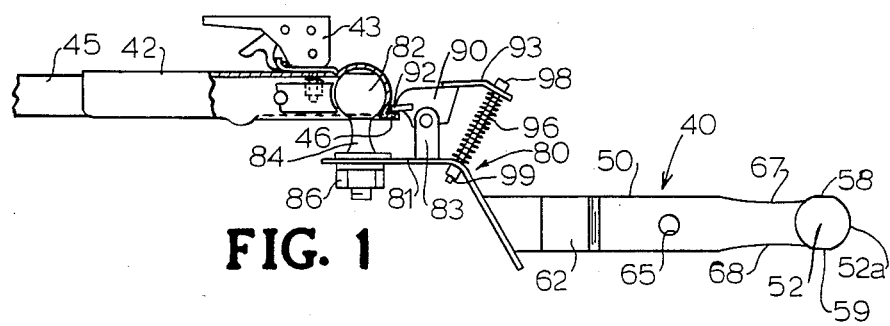
FIG. 1 is a side elevation view of a partial trailer tongue with an associated trailer hitch ball socket housing assembled with an auxiliary hitch shank member according to the invention.
Figure 2:
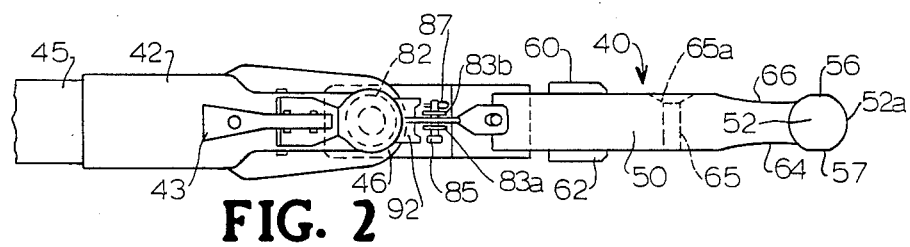
FIG. 2 is a top plan of the assembly of FIG. 1.
Figure 3:
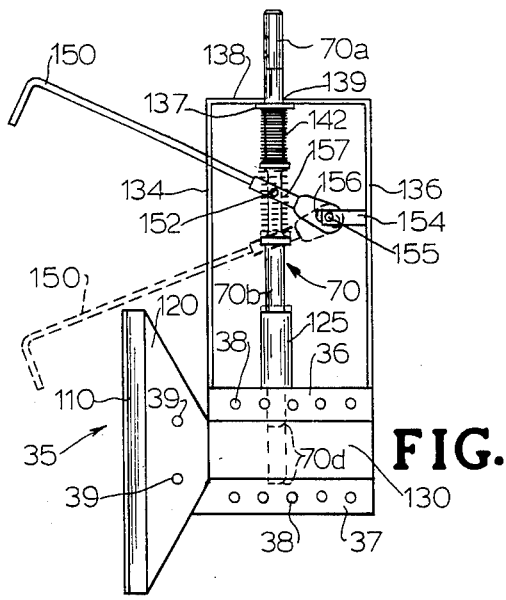
FIG. 3 is a top plan view of the receiving unit of the invention removed from the towing vehicle with the latch pin and lever arrangement illustrated in solid lines in an open/receiving position and in dashed lines in a closed/locked position.
Figure 4:
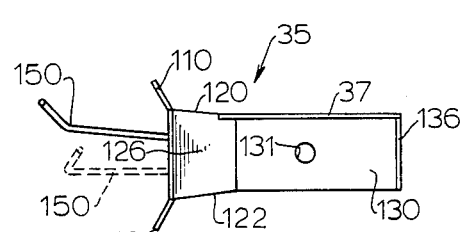
FIG. 4 is a side elevation view of the receiving unit of FIG. 3.
Figure 5:
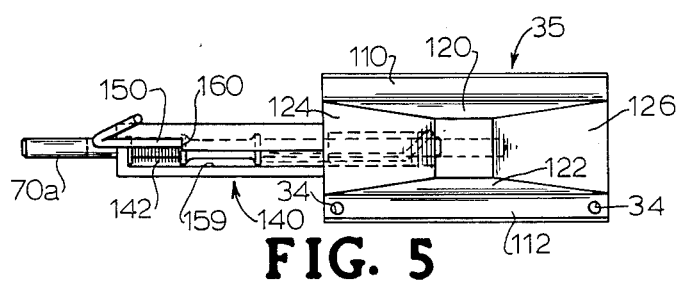
FIG. 5 is a front end elevation view of the receiving unit with the latch pin and lever in a solid line open position and in dashed lines in a closed or locked position.

With continuing reference to FIGS. 1 and 2, ball support 80 mounts on the horizontal platform portion 81 a upwardly-extending, vertical bracket 83 formed with sides 83a and 83b for receiving a pin 85 held by a cotter key 87. Pivot member 90 mounts on its forward edge a clamping member 92 and rearwardly mounts a spring support 93 tensioned by means of a spring 96 surrounding a bolt 98 having its upper end passing through tension member 93 and its lower end passing through ball support 80 with bolt 98 being secured by means of nut 99. Clamping member 92 has a curved front clamping edge conforming to the curvature of the clamped surfaces of ball socket housing 42. The bottom clamping surface of clamping member 92 mounts a Teflon pad, not shown, or is otherwise treated to reduce the sliding friction between the clamped surfaces.

In order to assemble shank unit 40 to the ball socket housing 42, cotter key 87 is removed enabling pin 85 and pivot member 90 to be disassembled from bracket 83. Ball socket housing 42 is then installed over ball 82 in the conventional manner and ball latch 43 is suitably positioned to retain housing 42 on ball 82. After this operation has been completed, pivot member 90 and pin 85 are reinstalled in bracket 82 and cotter key 87 is repositioned with spring 98 being allowed to force the clamp member 92 against the previously-mentioned ledge 46 of the conventional ball socket housing 42. Shank unit 40 is then manually positioned to reside horizontally. Spring 98 then serves to maintain the shank unit 40 extending forwardly from ball socket housing 42 and in the horizontal position in which it was positioned with suitable adjustments being made by loosening and tightening nut 99 to increase or decrease tension in spring 98 to achieve the normal horizontal position of shank unit 40. Additionally, it will be seen that if an unexpected pressure is applied to shank unit 40 to force it downwardly or upwardly, spring 98 will tend to restore shank unit 40 to a horizontal position and if otherwise returned to a horizontal position will retain shank unit 40 in such desired horizontal position. From the description of shank unit 40, the description next turns to a more detailed description of the receiving unit 35.

Receiving unit 35 is secured by suitable bumper and chassis brackets, not shown, to the particular towing vehicle being employed. Since trucks, passenger vans, passenger cars and passenger station wagons vary substantially in the types of bumper and chassis constructions employed and all are employed for towing recreational trailers, it will be understood that the manner of mounting may vary from vehicle to vehicle. Also, the size and shape of the receiving unit 35 may conform to the particular vehicle. The invention also contemplates that the receiving unit 35 may be made a part of a conventional bolt-on under car or under truck receiver. In use, ball 82 typically resides just behind the rear bumper.

Making reference to FIGS. 3-12 and to the construction and operation of receiving unit 35, there is provided an integral funnel-like entry structure for receiving and guiding shank unit 40 comprising upper entry ledge 110, lower entry ledge 112, upper slide wall 120, lower slide wall 122, left slide wall 124, and right side wall 126. The described entry structure merges into a hollow channel 130 with a locking pin receiving passage 131. Channel 130 has a cross-sectional shape conforming to the size and cross-sectional shape of ball 52 and shank 50 and in the illustrated embodiment has an internal square cross-sectional shape for loosely receiving the mating square cross-sectional external shape of shank 50 in the portion of shank 50 immediately forward of stop blocks 60, 62.

Figure 11:
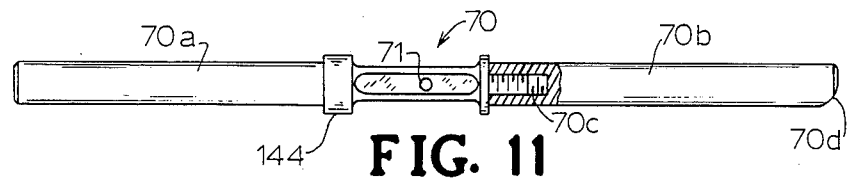
FIG. 11 is a top plan view of the latch pin.
Figure 12:
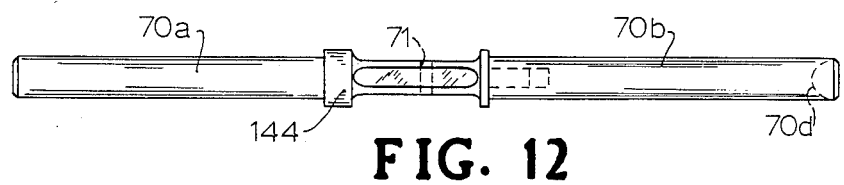
FIG. 12 is a side elevation view of the latch pin.

The locking end of locking pin 70 is guided by means of a metal tube 125 welded to one side of channel 130 and having its axis P oriented perpendicular to the channel axis C. A U-shaped metal frame 140 extends laterally outwardly from the side wall 132 (FIG. 6) on which pin guide tube 125 is mounted providing opposed side sections 134, 136 and end section 138. A compression spring 142 encircles pin 70 and is held between an annular spring mount 144 formed on pin 70 and a thrust washer 137 bearing on section 138 with pin 70 being allowed to slide in a slot 139 provided in section 138. As best illustrated in FIGS. 11 and 12, pin 70 comprises an outer member 70a which is threadably secured to an inner member 70b by means of threaded shank 70c. This arrangement allows member 70b to be installed in tube 125 and then connected to member 70b placed in frame section 138. Outer member 70a has a hole 71 for receiving a pin 152 for connecting lever 150. To facilitate uncoupling when lever 150 is cocked as in FIG. 7, the trailing surface 70d of locking pin 70 is tapered so as to ride on the tapered surface 65a (FIG. 2) of shank unit pin hole 65 when shank unit 40 starts being withdrawn from receiving unit 35. This arrangement also causes lever 150 to leave notch 160 and to restore lever 150 to the FIG. 8 position when the units are fully uncoupled.

Lever 150 pivots on pin 155 residing in slot 156 (FIG. 9) and mounted on bracket 154 mounted within side section 136. Pin 152 pivotally connects lever 150 with pin 70 and mounts in the O-section 157 (FIG. 10) of lever 150. Lever 150 is held in a cocked position by being placed as indicated in FIG. 6 in the slot 159 and notch 160 formed in section 134 of the U-frame 140.

Figures 7, 8:
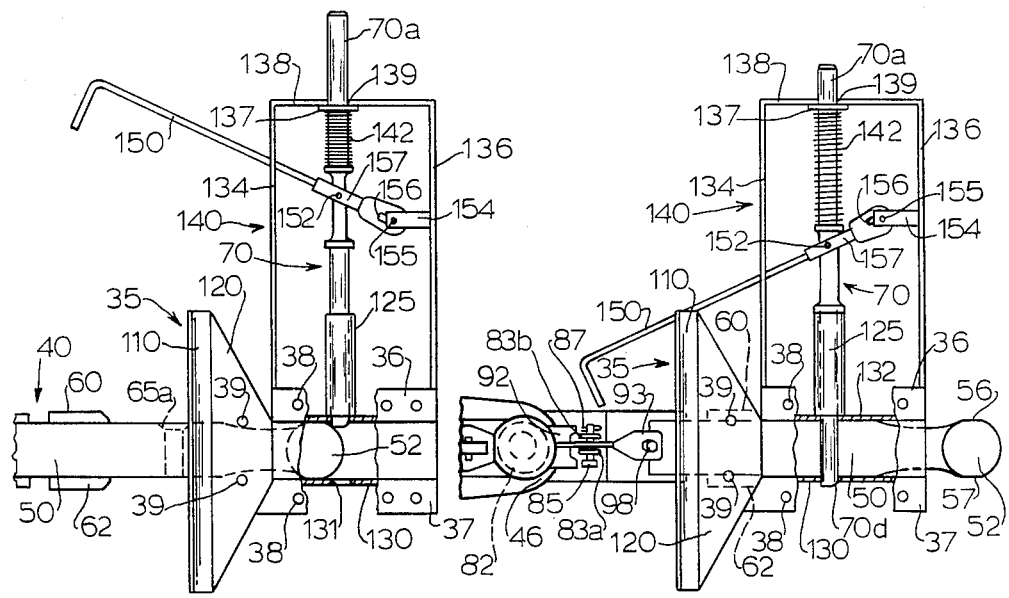
FIG. 7 is a top plan view of the receiving unit with the latch pin being actuated by the leading end of the shank portion.
FIG. 8 is a top plan view of the receiving unit with the latch pin passing through the shank portion and with the lever being in a locked position.
Figure 9:
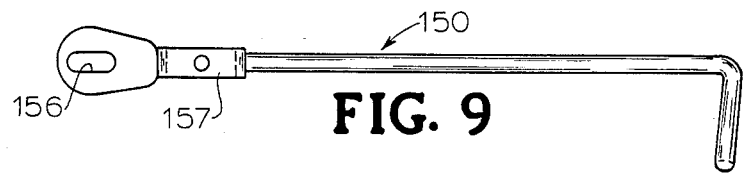
FIG. 9 is a top plan view of the lever.
Figure 10:
FIG. 10 is a side elevation view of the lever.

When lever 150 is in the cocked position, the leading end of pin 70 is located just slightly within the internal passage provided by channel 130 as seen in FIG. 7. Ball 52 on shank unit 40 is guided as the towing vehicle is backed into the described funnel-shaped entry and works its way into channel 130. When ball 52 comes into contact with the slightly protruding end of pin 70 in channel 130, lever 150 is released from its cocked position and by means of the tension provided by spring 142 is pressed into sliding contact with the tapered side surface 66 and, simultaneously with stop blocks 60, 62 reaching their proper position, pin 70 is mated with the passageway 65 passing through shank 50 such that it can become fully engaged as shown in FIG. 8.

In order to uncouple the shank unit 40 from the receiving unit 35, lever 150 is again cocked into the position illustrated in FIG. 7 which causes pin 70 to resume the FIG. 7 position. As the towing vehicle moves away, the shank unit 40 is withdrawn from the receiving unit 35 and at the start of such uncoupling tapered pin surface 70d (FIG. 11) rides on the tapered end surface 65a (FIG. 2) of pin hole 65. This action in turn causes lever 150 to leave notch 160 as pin 70 rides on surface 66 thus allowing shank 50 to be easily drawn out of the channel 130 and shank unit 40 to be completely separated from the receiving unit 35. Pin 70 then returns to the FIG. 8 position and thereby relieves the tension in spring 142.

The elevation above ground of the installed receiving unit 35 will vary with the type towing vehicle on which the receiving unit 35 is installed. Therefore, there is illustrated in FIG. 13 a modified form of shank unit 180 for a relatively high bumper type vehicle. In FIG. 13, the bent metal strip ball support 80' on shank 50' mounts the ball 82' by means of the ball mount 84' and nuts 86'. Bracket 83' receives pin 85' for mounting pivot member 90' having clampling member 92'. Pin 85' is secured by a cotter key, not shown. A spring 96' surrounds a bolt 98' passing through an upper end of support 80' and tension member 93' with bolt 98' being secured by nut 99'. From prior description and the correspondence of the identified elements in FIG. 13, it will be readily apparent that the FIG. 13 embodiment is installed and operates essentially like the embodiment previously explained.

From the foregoing, it can be seen that the improved trailer hitch 30 of the invention provides at least the following advantages:

(1) Adapts a conventional trailer ball socket coupling to an easily installed and removed automatic hitch without requiring that the trailer coupling be modified.

(2) Operates automatically to couple the trailer and towing vehicle.

(3) Eliminates the need, during the final coupling operation, to either manually align or precisely align the trailer and towing vehicle coupling units to achieve automatic coupling.

(4) Provides a hitch which can be manually latched in a disengaged position on the towing vehicle and then automatically coupled or uncoupled by the driver alone without requiring other assistance.

(5) Provides a hitch which when coupled locates the trailer ball socket housing and the trailer ball immediately adjacent the rear of the towing vehicle for effective weight balance.

(6) Allows the shank unit to be installed in locked position in the receiving unit and have the clamping mechanism removed from the shank unit so as to present a conventional type of vehicle ball mount on the rear of the towing vehicle for conventional non-automatic coupling to the conventional ball socket housing.

(7) Provides means for the shank unit to be moved to some preselected, forwardly-directed position, normally horizontal or near horizontal, to facilitate automatic coupling for the particular coupling condition.

(8) Provides means for distributing the braking load between the locking pin and the stop blocks.

(9) With the shank removed when the trailer is not being pulled, there is essentially no protrusion from the rear of the vehicle as with conventional fixed ball mounts which can easily injure or bruise the leg if accidentally struck.

(10) Provides for handicapped and elderly individuals a means for eliminating the normally heavy lifting and shifting of recreational trailers.

What is claimed is:

1. An automatic trailer hitch assembly for use with a towing vehicle and a towed trailer or other towed vehicle having a metal-formed housing with a ball socket at its towing end, comprising:
   (a) a shank unit for the towed vehicle providing elongated shank structure including:
      (i) at the trailing end a ball member adapted for being releasably coupled in the ball socket of said housing;
      (ii) at the leading end surfaces facilitating the guidance of said leading end when in contact with guide surfaces;
      (iii) means for releasably securing said elongated shank structure to said housing with said ball member coupled in said socket;
      (iv) means for maintaining said elongated shank structure in some selected forwardly-directed position preparatory to being coupled to a receiving unit on said towing vehicle;
      (v) a first passage therethrough for receiving a locking pin; and
   (b) a receiving unit adapted for being secured to the rear of the said towing vehicle for being releasably secured to said shank unit including:
      (i) entry structure providing tapered wall guide surfaces for receiving and guiding the leading end of said shank structure leading end as required to direct said leading end into coupling alignment when said leading end is moved into said entry structure;
      (ii) tubular structure forming an integral forward continuation of said entry structure and providing a bore for receiving said shank structure leading end after being guided thereto on said wall guide surfaces, the internal shape and length of said bore being selected to permit some predetermined length of said shank structure to enter said bore;
      (iii) a second passage through said tubular structure for receiving a locking pin therein and matable with said first passage when said predetermined length of said shank structure has been inserted in said bore; and
      (iv) locking structure mounted on said receiving unit and including:
         (aa) a locking pin movable between a first position in which the leading end of said locking pin slightly protrudes into and permits free passage of said shank structure into said tubular structure and a second position in which said pin passes through both said passages to couple said shank and receiving units together;
         (bb) lever means connected to said locking pin and movable with said pin between said first and second positions;
         (cc) spring tensioning means arranged to be tensioned when said lever means moves said pin to said first position and to apply the force of such tensioning when said lever moves with said pin to said second position; and
         (dd) frame structure mounting said locking pin, lever means and spring tensioning means enabling said lever means to be cocked into said first position and to be automatically released from said first position when the leading end of said locking pin protruding into said bore engages said leading end of said shank structure.

2. An automatic trailer hitch assembly as claimed in claim 1 wherein said guide wall surfaces are arranged so as to permit the leading end of said shank structure to be guided both horizontally and vertically when moving into said coupling alignment.

3. An automatic trailer hitch assembly as claimed in claim 2 wherein the leading end of said shank structure mounts a ball member and said ball member forms leading end surfaces of said shank structure.

4. An automatic trailer hitch assembly as claimed in claim 3 wherein said ball member has flattened side, top and bottom surfaces and said shank structure has an inwardly curved surface merging with and leading rearwardly from a selected flattened side surface of said shank structure located so as to be engagable with said pin when said shank structure is moving relative thereto.

5. An automatic trailer hitch assembly as claimed in claim 1 wherein said tensioning means comprises a spring encircling said locking pin and compressed between a portion of said frame structure in which said pin slides and spring support means fixed to said pin.

6. An automatic trailer hitch assembly as claimed in claim 1 wherein said housing has a front ledge portion and said means for releasably securing and maintaining said elongated shank structure in some predetermined position comprises springloaded means mounted on said shank structure for clamping said ledge portion of said housing to said shank structure and said selected position comprises a substantially horizontal forwardly-directed position.

7. An automatic trailer hitch as claimed in claim 1 wherein the leading end of said locking pin and the entry of said first passage are tapered in a manner enabling said shank unit to be withdrawn when said lever means is in said cocked first position and operative to allow said lever means to return to said first position on completion of said withdrawal.

8. A trailer hitch assembly, comprising:
   (a) an elongated shank structure having a trailer hitch ball mounted on a trailing end, a leading end formed for being guided when engaging guide surfaces and means enabling said shank structure to be detachably secured to a ball socket housing coupled to said ball member and when so secured to be held appropriately positioned for coupling to a receiving unit;
   (b) a receiving unit having a tapered entry wall portion for guiding said leading end and leading therefrom a tubular portion providing a bore for receiving a predetermined length of said shank structure; and
   (c) spring-loaded locking means mounted on said receiving unit and adapted to be placed in a cocked position and in such cocked position to be held sufficiently free of said bore to permit passage of said shank structure therein and to be placed in an uncocked position to move into a position within said bore for releasably locking said shank and tubular structures together, said shank structure and locking means being operatively associated such that entry of said shank structure into said bore acts to release said locking means from said cocked to said uncocked position.

9. An automatic trailer hitch assembly for use with a towing vehicle and a towed trailer or other towed vehicle having a metal-formed housing with a ball socket at its towing end, comprising:
   (a) a shank unit for the towed vehicle providing elongated shank structure including:
      (i) at the trailing end a ball member adapted for being releasably coupled in the ball socket of said housing;
      (ii) means for releasably securing said elongated shank structure to said housing with said ball member coupled in said socket;
      (iii) means for maintaining said elongated shank structure in some selected forwardly-directed position preparatory to being coupled to a receiving unit on said vehicle;
   (b) a receiving unit adapted for being secured to the rear of the said towing vehicle for being releasably secured by said shank unit including:
      (i) entry structure providing tapered wall guide surfaces for receiving and guiding the leading end of said shank structure leading end as required to direct said leading end into coupling alignment when said leading end is moved into said entry structure;
      (ii) tubular structure forming an integral forward continuation of said entry structure and providing a bore for receiving said shank structure leading end after being guided thereto on said wall surfaces, the internal shape and length of said bore being selected to permit some predetermined length of said shank structure to enter said bore; and
      (iii) spring-loaded locking means mounted on said receiving unit and adapted to be placed in a cocked position and in such cocked position to be held sufficiently free of said bore to permit passage of said shank structure therein and to be placed in an uncocked position to move into a position within said bore for releasably locking said shank and tubular structures together, said shank structure and locking means being operatively associated such that entry of said shank structure into said bore acts to release said locking means from said cocked to said uncocked position.

* * * * *